United States Patent

Krüger et al.

[11] 4,406,195
[45] Sep. 27, 1983

[54] QUICK-RELEASE TOOL ASSEMBLY

[75] Inventors: Heinrich Krüger, Essen; Hans Tack, Velbert, both of Fed. Rep. of Germany

[73] Assignee: Fried. Krupp Gesellschaft mit beschränkter Haftung, Essen, Fed. Rep. of Germany

[21] Appl. No.: 237,903

[22] Filed: Feb. 25, 1981

[30] Foreign Application Priority Data

Feb. 28, 1980 [DE] Fed. Rep. of Germany ....... 3007440

[51] Int. Cl.³ .................... B23B 29/00; B23B 29/03
[52] U.S. Cl. ................................ 82/36 B; 82/36 R; 408/239 A
[58] Field of Search ............ 82/36 R, 36 B; 407/104, 407/109; 408/239 R, 239 A; 409/233

[56] References Cited

U.S. PATENT DOCUMENTS

| | | | |
|---|---|---|---|
| 3,747,946 | 7/1973 | Edens | 279/1 B |
| 4,135,418 | 1/1979 | McCray et al. | 82/36 A |
| 4,197,044 | 4/1980 | Cummings | 408/239 A |
| 4,197,771 | 4/1980 | Heaton et al. | 82/36 A |
| 4,322,190 | 3/1982 | Anderson | 279/1 B |

FOREIGN PATENT DOCUMENTS

| | | | |
|---|---|---|---|
| 362830 | 12/1931 | United Kingdom . | |
| 1219304 | 1/1971 | United Kingdom . | |
| 1301580 | 12/1972 | United Kingdom . | |
| 1399429 | 7/1975 | United Kingdom . | |
| 1456611 | 11/1976 | United Kingdom | 408/239 A |
| 2070473 | 9/1981 | United Kingdom | 82/36 R |

*Primary Examiner*—Robert E. Garrett
*Assistant Examiner*—Jerry Kearns
*Attorney, Agent, or Firm*—Spencer, Kaye & Frank

[57] ABSTRACT

A tool assembly has a tool head insertable on a basic tool holder. The basic tool holder has a longitudinally displaceable locking bar and a plurality of slidable locking pins actuated by the locking bar. In a first position of the locking bar the locking pins are in an advanced position in which they project into respectively aligned lock holes of the tool head inserted on the basic tool holder. In a second position of the locking bar the locking pins are in a withdrawn condition, permitting the tool head to be pulled off the basic tool holder.

8 Claims, 4 Drawing Figures

QUICK-RELEASE TOOL ASSEMBLY

BACKGROUND OF THE INVENTION

This invention relates to a tool assembly formed essentially of a basic tool holder and a tool head in which a cutting tool—such as a drill or a cutting insert—is immobilized and which is coupled to the basic tool holder by a cylindrical fitting and mechanical clamping (locking) elements. The invention is in particular concerned with metal cutting tools which are essentially formed of a basic tool holder and a cutting tool head. The loosening and tightening of the clamping elements may be effected manually or mechanically.

Mechanically coupled cutting tools of the above-outlined type are widely known; among these are, for example, boring bars, that is, tools adapted for internal turning and having replaceable boring heads which are connected with the boring bar by means of a dovetail or a cylindrical fitting. Couplings of this type are disadvantageous in that in general they require additional tightening screws which, for replacing the head, have to be manually loosened and then tightened. Consequently, this type of coupling is not adapted for an automated machining cycle which includes robot-performed replacement of the tool head.

It has already been proposed to equip numerically controlled machine tools with tool changing devices which provide that the cutting tools, including the tool holders, can be moved manually or by a tool changer from a work position, such as a tool turret or a work spindle, to a tool magazine where they are deposited and then another tool is brought into the work position. In such assemblies, however, the machining cycle can be automated only to a limited extent, because for each changing of the cutting tool every time the expensive and usually very heavy basic tool holder has to be replaced too. Because of this kind of replacement process, the machine tools cannot be utilized in an optimal manner. It is a further disadvantage of the machine tools outlined above that a manual tool replacement is time-consuming and circumstantial.

There has been, however, proposed a fully automated machine cycle with cutting insert exchanger in turning operations. Upon a control command, the cutting insert exchanger automatically substitutes a new cutting insert from a magazine for the used cutting insert after the service time of the latter has lapsed. Such apparatuses, however, can be used only in special operations and are limited to the use of cutting tools of predetermined uniform configurations and dimensions. A replacement of different cutting tools is thus not feasible with such an arrangement. In machining runs, however, a plurality of different operations have to be performed, such as internal or external machining, threading drilling, etc.

SUMMARY OF THE INVENTION

It is an object of the invention to provide an improved tool assembly with which different tools, particularly cutting tools can be used and which permits a simple, machine-performed replacement of the tools as part of an automated machining cycle.

It is a further object of the invention to provide an improved tool assembly which permits a manual replacement of the tool head as well.

It is still another object of the invention to provide an improved tool assembly which meets all the conditions that are indispensable in the field of turning operations and in the use of commercially available metal cutting tools such as drills or cutting inserts.

These objects and others to become apparent as the specification progresses, are accomplished by the invention, according to which, briefly stated, the tool assembly according to the invention comprises a basic tool holder having a longitudinally displaceable locking bar and a plurality of slidable locking pins actuated by the locking bar. In a first position of the locking bar the locking pins are in an advanced position in which they project into respectively aligned lock holes of the tool head inserted on the basic tool holder. In a second position of the locking bar the locking pins are in a withdrawn condition, permitting the tool head to be pulled off the basic tool holder.

The above-outlined arrangement according to the invention ensures a simple, yet operationally reliable immobilization of the tool head on the basic tool holder. A shifting of the locking bar which may be performed automatically, causes a withdrawal of the locking pins which thus slide out of the lock holes of the tool head so that by means of grippers—which may be automatically controlled—the tool head may be taken off the basic tool holder and replaced by another tool head. Further, the tool assembly according to the invention is adapted both for tools designed for internal and external machining.

According to a further feature of the invention, the basic tool holder has at its front end an offset receiving stub which may be of cylindrical configuration and on which the tool head, provided with a complemental receiving bore, may be inserted. In the inserted state the tool head, with its outer annular planar edge surface, engages face-to-face a shoulder surface of the basic tool holder. Thus, the tool head is, with a cylindrical bore, received and centered on a similarly shaped stub of the basic tool holder and is, at the same time immobilized in an outer annular zone against a planar shoulder face of the basic tool holder. The chucking of the tool head on the basic tool holder is effected by radially outwardly effective locking pins which are arranged in the receiving stub of the basic tool holder and which, by means of the locking bar, are pressed into depressions of the tool head and thereby tighten the tool head against the planar support face of the basic tool holder. The locking bar may be shifted (to effect unlocking) by hydraulic or pneumatic means. The depressions in the basic tool holder may be constituted by a single circumferential groove.

According to a further feature of the invention, the locking bar has a head which cooperates with the rear terminus of a plurality of obliquely oriented locking pins slidably supported in the receiving stub of the basic tool holder. Thus, in the operative position the locking pins are pressed by a part of the locking bar into the depressions of the tool head, whereby a rigid fixing of the tool head on the basic tool holder is ensured.

According to a further feature of the invention, the locking bar is arranged in a central bore of the basic tool holder and is biased by the force of one or more disc springs or compression springs. A release of the locking bar by overcoming the spring force may be effected by applying a forwardly-directed mechanical pressure on the locking bar. The resulting shift of the locking bar allows the locking pins to withdraw from the depressions of the tool head, so that the latter is unlocked and thus may be lifted off the basic tool holder. The locking bar can be shifted by pneumatically or hydraulically controlled setting elements and thus may be partially or entirely automated. In the alternative, the locking bar may be shifted manually.

For facilitating a manual operation of the locking bar, according to a further feature of the invention an externally accessible setscrew is provided which, when turned, shifts the locking bar. In this manner, it is feasible to so structure the tool assembly—primarily designed for an automated operation—that the advantages of a universally applicable tool head are preserved. Even though a high degree of automation cannot be achieved with such an arrangement, time periods required for auxiliary, secondary operations are significantly shortened.

According to a further embodiment of the invention, the basic tool holder has a locking bar loaded by a coil compression spring. After loosening the above-noted, externally accessible setscrew, the compression spring expands and advances the locking bar, causing unlocking of the locking pins. Thereafter the tool replacement may be performed manually.

According to a further feature of the invention, the locking pins are, at their terminus cooperating with the locking bar, provided with a head which prevents the pins from falling out of the basic tool holder when the tool head is taken off. Underneath the head of the locking pins there are mounted respective compression springs which withdraw the locking pins inwardly automatically when the locking bar is shifted into the releasing position.

According to a further feature of the invention, the coupling between the basic tool holder and the tool head is rotationally symmetrical and is provided, for indexing and for preventing rotation, in a known manner with one or more aligning devices. Preferably, the tool head has two grooves into which project torque-transmitting pins of the basic tool holder. The mount is so designed that the tool head may be received in either of two positions offset 180° with respect to one another. In this manner, the basic tool holder can be universally applied and thus permits the use of tool heads for left-hand or right-hand cutting.

DESCRIPTION OF THE PREFERRED EMBODIMENTS

Figure 1:
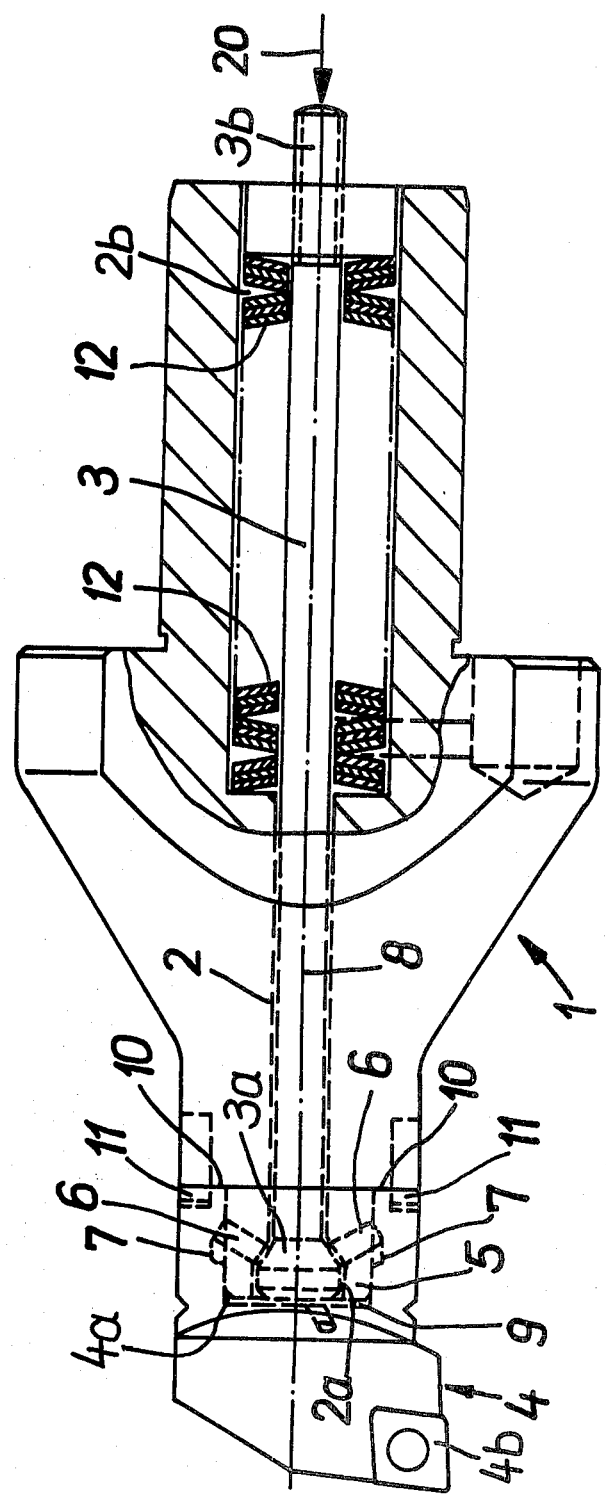
FIG. 1 is a side elevational view, partially in section, of a preferred embodiment of the invention.

The tool assembly illustrated in FIG. 1 essentially comprises a basic tool holder 1 having an axial bore 2 adjoined at the front end by a conically forwardly flaring space 2a and, at the rear end, by an enlarged cylindrical chamber 2b. Through the bore 2 and the chamber 2b there extends a locking bar 3 having a conical head 3a accommodated in the space 2a. To the frontal end face of the basic tool holder 1 there is secured a tool head 4, such as a boring head, in a manner to be described below.

The basic tool holder 1 accommodates, in a central receiving stub 5, a plurality of slidable locking pins 6 which, with an end projecting into the space 2a, cooperate with the head 3a of the locking bar 3 and, with their other end, extend into depressions (lock holes) 7 provided in the tool head 4. Each locking pin 6 forms an angle of between 45° and 75°, preferably 60°, with the longitudinal axis 8 of the basic tool holder 1. The locking bar 3 is loaded by a plurality of spring discs 12 which are disposed in the chamber 2b and which exert a sufficient pulling force on the locking bar 3 in a direction opposing arrow 20 to ensure that the head 3a presses the locking pins 6 into the depressions 7 with a sufficiently large force to ensure a satisfactory securing of the tool head 4 on the basic tool holder 1.

The tool head 4 is connected with the basic tool holder 1 in the following manner: the tool head 4 is centered on the receiving stub 5 which constitutes the forwardmost portion of the basic tool holder 1 and which extends into a conforming cavity 4a of the tool head 4. With an outer annular radial edge face 10 the tool head 4 abuts against a radial shoulder face of the basic tool holder 1. To the outer face of the basic tool holder 1 there are secured aligning pins 11 which fit into respective slots 11a provided in the tool head 4, for determining the angular position of the tool head 4 on the basic tool holder 1. The securing of the tool head 4 to the basic tool holder 1 is effected by the locking bar 3 on which act the pressure forces of the spring discs 12, so that the conical head 3a of the locking bar 3 presses on the locking pins 6 which are thus radially outwardly advanced and project into the respective depressions 7 such that the pin ends obliquely rearwardly press against the base of the depressions, whereby the tool head 4 is axially urged against the basic tool holder 1.

The removal of the tool head 4 is effected in the reverse order and is initiated by exerting an external pressure force in the direction of arrow 20 on the outer rear terminus 3b of the locking bar 3 remote from the tool head 4. The force is sufficiently large to overcome the opposing force of the spring discs 12, whereby the locking bar slides in the direction indicated by arrow 20. Thus, the head 3a allows the locking pins 6 to slide out of the depressions 7 of the tool head 4.

Figure 2:
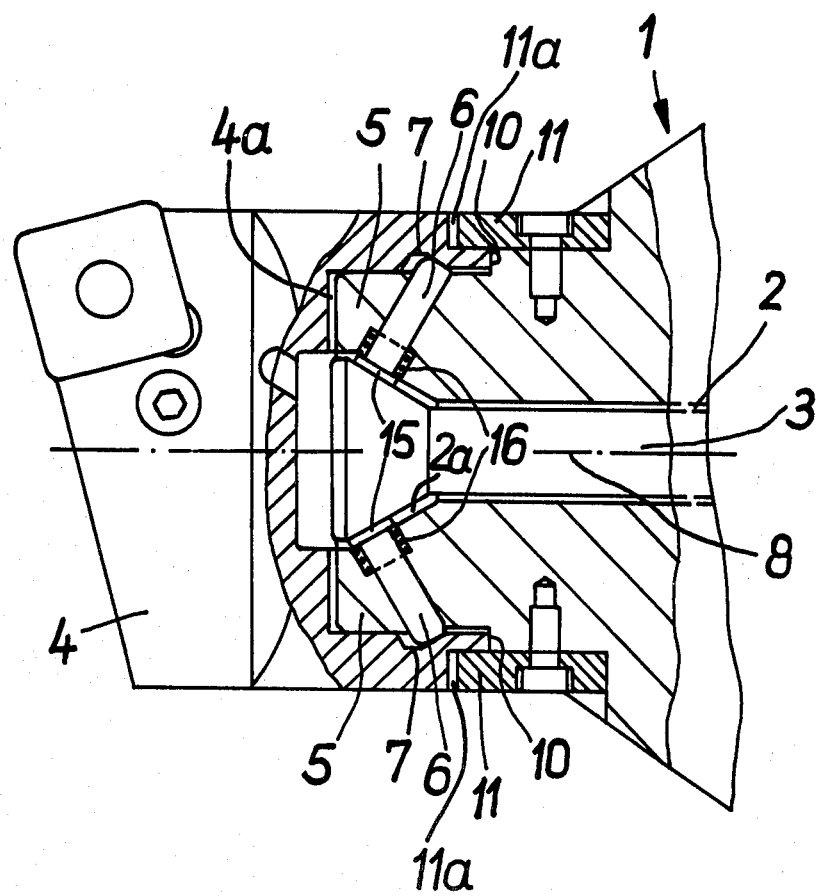
FIG. 2 is an axial sectional view, on an enlarged scale, of a part of the preferred embodiment, having a modified detail.
Figure 3:
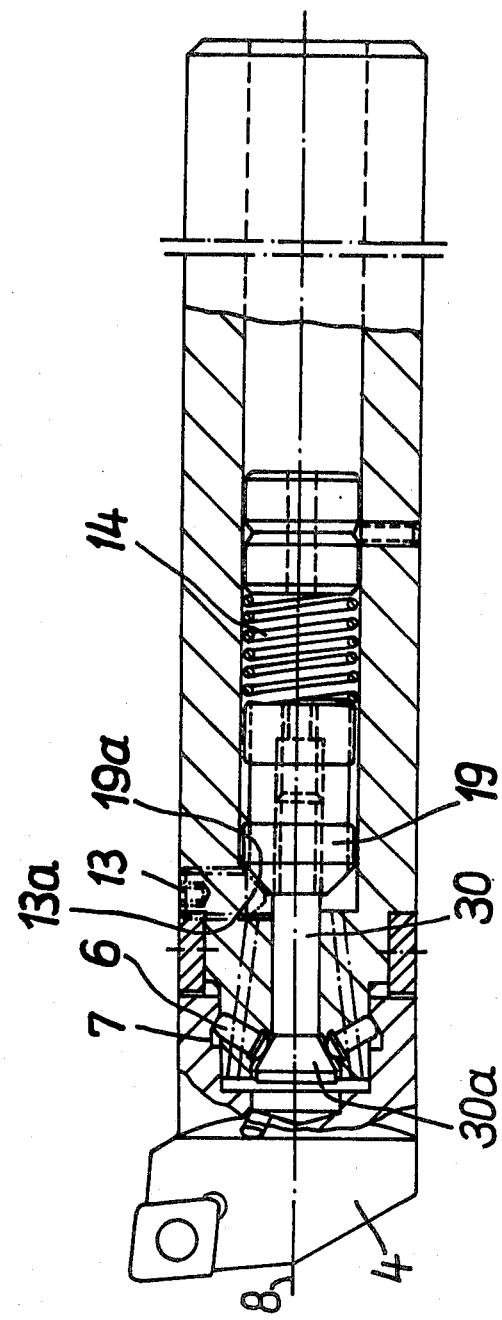
FIG. 3 is a side elevational view, partially in section, of another preferred embodiment of the invention.

In a variant illustrated in FIG. 2, each locking pin 6 has a head 15 engaged by a compression spring 16 which urges the respective locking pin 6 into a withdrawn position relative to the associated depression 7. In addition to serving as a spring support, the head 15 of each locking pin 6 prevents the latter from falling out of the basic tool holder 1 when the tool head 4 is absent. Turning now to FIG. 3, there is illustrated a further embodiment of the tool assembly according to the invention, adapted for a manual replacement of the tool head 4. In this embodiment the locking bar 30 carries, at a distance from its head 30a, a lug 19 which has a conical surface 19a. An externally accessible adjusting screw 13 is threadedly held in the basic tool holder and has an axis which is perpendicular to the basic tool holder axis 8. The adjusting screw 13 has a conical surface 13a which cooperates with the conical face 19a of the lug 19 so that a turning of the setting screw 13 in the one or the other direction will cause, by cooperation with the lug 19, a shift of the locking bar 30 parallel to its axis 8. The locking bar 30 is urged in the forward, releasing direction by means of a coil spring 14. Thus, when the setscrew is screwed into the basic tool holder, the locking bar 30 is shifted rearwardly (that is, away from the tool head 4), whereby the head 30a presses the locking pins 6 radially outwardly into the depressions 7 of the tool head 4. Conversely, if the setscrew is screwed outwardly, the withdrawing conical face 13a of the setscrew 13 permits the locking bar 30 to be advanced towards the tool head 4 by the spring 14, thus causing the locking pins 6 to slide out from the respective depressions 7 of the tool head 4. Thereupon the latter may be readily pulled off the basic tool holder.

Figure 4:
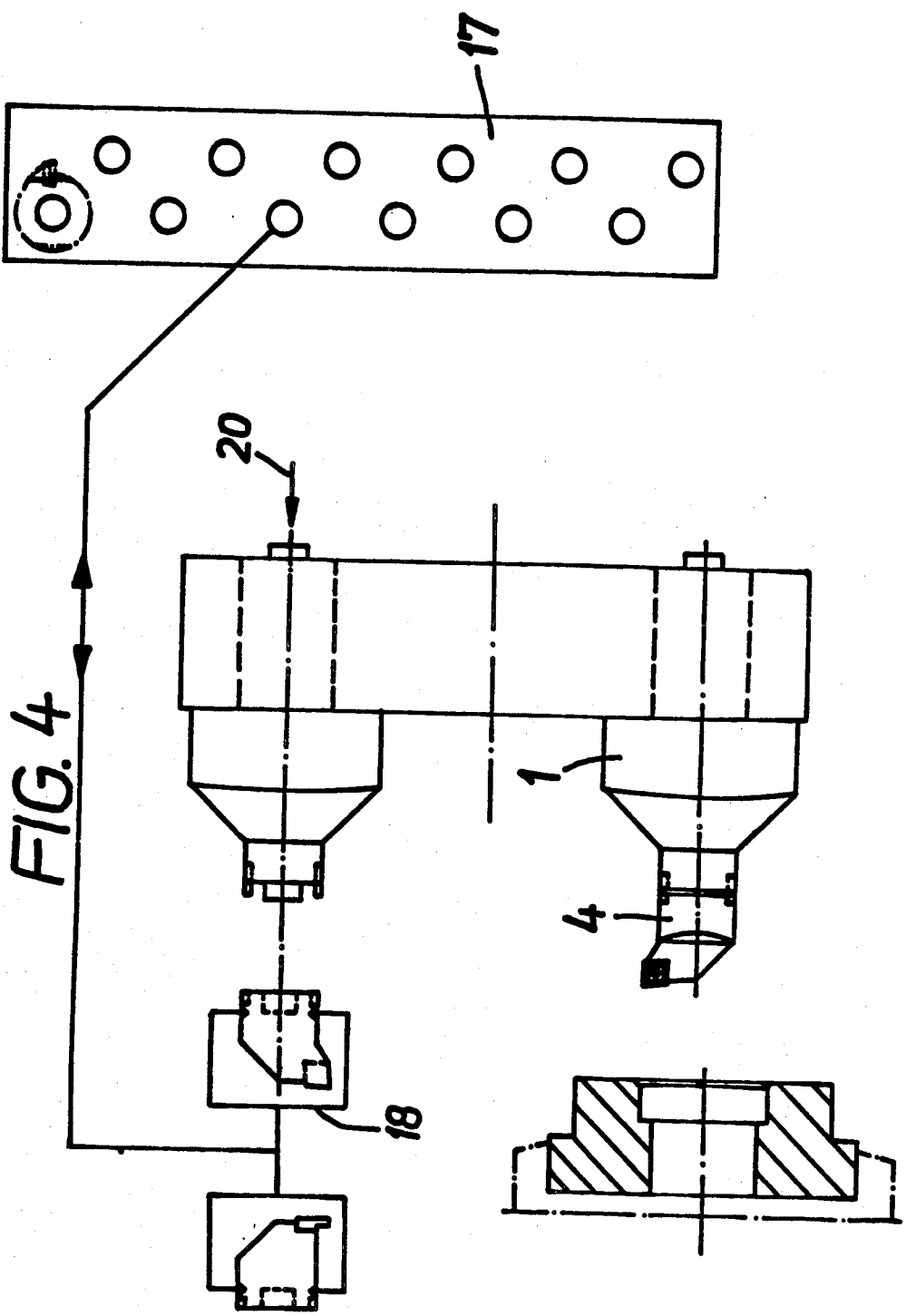
FIG. 4 is a schematic, flowchart-type illustration of a changing process for a tool assembly structured according to the invention.

Turning now to FIG. 4, there is schematically shown how the tool head 4 can be removed by a gripper 18 and deposited in a tool magazine 17 from which, in turn, the gripper can pick up another tool head and insert it on the basic tool holder 1. The latter may be mounted, for example, on a turret-type machining tool. The operational steps illustrated in FIG. 4 may be fully automated: after completion of a predetermined operation or after the cutting tool tool has come to the end of toollife, the control signal is emitted which initiates a hydraulic or pneumatic release of the locking bar 3. As a result, the tool head is no longer locked to the basic tool holder, but is only loosely supported thereon. Thereupon the loosely supported tool head 4 is pulled off the basic tool holder 1 by means of the gripper 18 and is deposited in the tool magazine 17.

In the subsequent operational step, the gripper 18 picks up another tool head 4 and inserts it centrally on the basic tool holder. This occurrence is followed by a further control pulse allowing the locking bar 3 to shift rearwardly which results in the immobilization of the tool head 4 on the basic tool holder 1 as described earlier.

The above-outlined cutting tool replacing process is advantageous in that the basic tool holder remains in the tool turret and the changing operation is limited to a relatively small and simple component, namely the tool head in which the appropriate cutting tool has been previously mounted. The tool head may be, for example, a tool head designed primarily for internal machining. For the external machining less limitations are required as regards the design of the tool, but in case of turning, for example, the geometry of the cutting tool bits are similar or identical to those used for the internal machining. For this reason, tool heads which have identical coupling dimensions can also be used for external machining, so that lathes can be equipped with turret heads and automatic tool replacing means and further, tools for both inner and external machining may be utilized. It is only necessary to mount in the tool turret head the basic tool holders which, for inner machining, have the required longer overhanging and the basic tool holders for external machining which are in general arranged radially rather than axially. The basic tool holders for external machining have a short, compact construction and can therefore be exposed to higher loads. The connection between the cutting head and the basic tool holder for the outer and inner machining tools is of uniform construction so that, for example, a boring tool designed for an inner machining may also be used, if required, as a facing tool for external machining. Thus, with a reduced number of tool types more operations can be performed than it has been possible heretofore and in the tool magazine of the machine only the small tool heads have to be stored; consequently, because of the reduced cost and spatial requirements, a greater number of tools can be stored, resulting in a greater output and further, at the end of the service life of a cutting tool bit, the replacement bit can be inserted without interrupting the operation. If, for example, in lathes used heretofore it has been feasible to arrange approximately a dozen of different tools as a basic tool set, as a result of the reduced spatial requirement, at least three times as many tools may be stored; that is, in case of a basic requirement of twelve tools, the operation may be performed with at least three service lives in succession. As a result, the machining operation may be performed without manual interference over a longer time period, whereby the degree of efficiency of the machine is substantially improved and, at the same time, the labor input is decreased.

Dependent upon the technical specification of the machine and the machining to be performed, the tool assembly according to the invention may have different dimensions and configurations. For the inner machining in the smaller range of diameter cutting heads may be used which have an offset configuration or have a chuck arrangement for receiving drills, countersinks or the like. The cutting heads may be of different configuration, while the coupling dimensions remain the same. The cutting heads may be provided with brazed carbide tips or, as shown in the drawing, may receive clamped-on indexable cutting inserts.

The cross-sectional configuration of the tool assembly according to the invention is preferably cylindrical in the zone of the coupling between the tool head and the basic tool holder, but may have any other cross-sectional configuration, for example, it may be quadratic for external machining.

In order to provide a central coolant supply, the inside of the basic tool holder may be provided with bore holes and openings which direct a coolant lubricant to the cutting edge through an opening in the tool head.

In the described preferred embodiment of the invention the coupling between the basic tool holder and the tool head is axially symmetrical so that it is feasible to mount the tool head on the basic tool holder in either of two positions which are offset at 180° to one another. In this manner both the number of basic tool holders and the number of tool heads may be maintained small and by changing the mounting position there may be achieved a greater diversity.

It will be understood that the above description of the present invention is susceptible to various modifications, changes and adaptations and the same are intended to be comprehended within the meaning and range of eqivalents of the appended claims.

What is claimed is:

1. A quick release tool assembly comprising
   (a) a basic tool holder having a front end, a rear end, a longitudinal axis and an axially projecting receiving stub at said front end;
   (b) a tool head having an inner wall defining an outwardly open cavity and a depression provided in said inner wall and bounded by a bottom forming part of said inner wall; said tool head being mountable on, and removable from said basic tool holder by insertion of said receiving stub in and removal from said cavity;
   (c) a plurality of locking pins slidably held in passages of said receiving stub in a distribution about said axis; each said locking pin having an outer end in alignment with said depression when said tool head is in a mounted state on said basic tool holder and an inner end being closer to said axis than said outer end; each said locking pin extending obliquely rearwardly with respect to said longitudinal axis whereby said inner end of said locking pin being closer to said front end of said basic tool holder than said outer end;

(d) spring means in engagement with each said locking pin for urging each said locking pin to slide towards said axis;

(e) a locking bar longitudinally slidably held in an axial channel of said basic tool holder substantially in alignment with said axis; said locking bar having a head portion situated at said front end of said basic tool holder; said head portion having a substantially conical surface tapering toward said rear end of said basic tool holder; said conical surface being in engagement with the inner end of each said locking pin; said locking bar having first and second axial positions; in said second axial position said locking bar being shifted towards said rear end relative to said first axial position; in said first axial position of said locking bar said locking pins being withdrawn from said bottom of said depression and in said second axial position of said locking bar said conical surface presses each locking pin into clamping engagement with said bottom of said depression, whereby a force derived from said clamping engagement urges said tool head on said receiving stub axially towards said rear end of said basic tool holder; and (f) displacing means for moving said locking bar into said second axial position.

2. A quick-release tool assembly as defined in claim 1, further comprising a radial edge face forming part of said tool head and a radial shoulder forming part of said basic tool carrier and surrounding said longitudinal axis; said radial edge face and said radial shoulder are pressed into a face-to-face abutting relationship during said clamping engagement.

3. A quick-release tool assembly as defined in claim 2, wherein said edge face and said shoulder are rotationally symmetrical with respect to said longitudinal axis; and further comprising cooperating aligning means on said basic tool holder and said tool head for determining and maintaining a given angular position of said tool head with respect to said basic tool holder.

4. A quick-release tool assembly as defined in claim 1, wherein said displacing means comprises a setscrew threadedly held in said basic tool holder and cooperating with said locking bar by wedging action for shifting said locking bar into said second axial position.

5. A quick-release tool assembly as defined in claim 4, further comprising spring means accommodated in said axial channel of said basic tool holder for urging said locking bar into its said first axial position.

6. A quick-release tool assembly as defined in claim 1, further wherein each said locking pin has, at said inner end thereof, an enlargement for preventing the respective locking pin from dropping out of said basic tool holder in the absence of said tool head from the basic tool holder.

7. A quick-release tool assembly as defined in claim 1, wherein said displacing means comprises spring means accommodated in said basic tool holder for urging said locking bar into said second axial position; said locking bar having an externally engageably rear portion for displacing said locking bar into said first axial position by an external force applicable to said rear portion of said locking bar.

8. A quick-release tool assembly as defined in claim 1, wherein said depression in said basic tool holder comprises a plurality of lock holes being in alignment with respective said locking pins when said tool head is in a mounted position on said basic tool holder.

* * * * *